US011120460B2

(12) United States Patent
Fukuda et al.

(10) Patent No.: US 11,120,460 B2
(45) Date of Patent: Sep. 14, 2021

(54) EFFECTIVENESS OF SERVICE COMPLEXITY CONFIGURATIONS IN TOP-DOWN COMPLEX SERVICES DESIGN

(71) Applicant: INTERNATIONAL BUSINESS MACHINES CORPORATION, Armonk, NY (US)

(72) Inventors: Mari A. Fukuda, Tokyo (JP); Kugamoorthy Gajananan, Tokyo (JP); Shun Jiang, San Jose, CA (US); Aly S. Megahed, San Jose, CA (US); Taiga Nakamura, Santa Clara, CA (US); Mark A. Smith, Skeffington (GB)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 14/977,383

(22) Filed: Dec. 21, 2015

(65) Prior Publication Data

US 2017/0178168 A1     Jun. 22, 2017

(51) Int. Cl.
G06Q 30/02     (2012.01)

(52) U.S. Cl.
CPC ..... *G06Q 30/0206* (2013.01); *G06Q 30/0201* (2013.01); *G06Q 30/0202* (2013.01); *G06Q 30/0204* (2013.01)

(58) Field of Classification Search
None
See application file for complete search history.

(56) References Cited

U.S. PATENT DOCUMENTS 6,195,646 B1   2/2001   Grosh et al.
6,963,854 B1   11/2005  Boyd et al.
(Continued)

FOREIGN PATENT DOCUMENTS

WO   2012016439 A1   2/2012
WO   2014014470 A1   1/2014
WO   2014060226 A1   4/2014

OTHER PUBLICATIONS

Bardsiri et al., "Increasing the accuracy of software development effort estimation using projects clustering", IET Software, 2012, vol. 6, Issue 6, pp. 461-473 (Year: 2012).*
(Continued)

*Primary Examiner* — Rutao Wu
*Assistant Examiner* — Sarjit S Bains
(74) *Attorney, Agent, or Firm* — Sherman IP LLP; Kenneth L. Sherman; Hemavathy Perumal (57) ABSTRACT

One embodiment provides a method comprising receiving historic peer deals relating to at least one service, and a baseline and cost percentage estimation for each service. Historic peer cost data for each service is clustered to form at least one cluster. Each cluster includes similar unit costs, and has an assigned label. A classification model is trained based on each baseline received, each cost percentage estimation received, and each assigned label. For each assigned label, a corresponding probability distribution is computed based on the classification model. For each service of a new client solution, an assigned label for the service is predicted based on the classification model, and, based on a probability distribution corresponding to the assigned label predicted, transforming an initial range of historic peer cost data relating to the service into a narrower range for use in estimating a cost of the service with improved accuracy.

20 Claims, 10 Drawing Sheets

(56) References Cited

U.S. PATENT DOCUMENTS

| | | | |
|---|---|---|---|
| 7,010,494 | B2 | 3/2006 | Etzioni et al. |
| 7,039,559 | B2 | 5/2006 | Froehlich et al. |
| 7,139,733 | B2 | 11/2006 | Cao et al. |
| 7,324,969 | B2 | 1/2008 | Pallister et al. |
| 7,571,120 | B2 | 8/2009 | Fellenstein et al. |
| 7,610,233 | B1 | 10/2009 | Leong et al. |
| 7,711,747 | B2 | 5/2010 | Renders et al. |
| 7,853,473 | B2 | 12/2010 | Davis et al. |
| 7,865,364 | B2 | 1/2011 | Anderson et al. |
| 7,877,293 | B2 | 1/2011 | Biebesheimer et al. |
| 7,937,304 | B2 | 5/2011 | Melnicoff et al. |
| 7,971,180 | B2 | 6/2011 | Kreamer et al. |
| 8,352,355 | B2 | 1/2013 | Ettl et al. |
| 8,584,135 | B2 | 11/2013 | Boss et al. |
| 8,676,981 | B2 | 3/2014 | Hackett et al. |
| 8,781,989 | B2 | 7/2014 | Duchon |
| 8,892,625 | B2 | 11/2014 | Liang et al. |
| 9,041,797 | B2 | 5/2015 | Shaffer et al. |
| 9,124,601 | B2 | 9/2015 | Stoica et al. |
| 9,129,299 | B1 | 9/2015 | Donohue et al. |
| 9,230,216 | B2 | 1/2016 | Bart et al. |
| 9,286,391 | B1 | 3/2016 | Dykstra |
| 9,418,339 | B1 | 8/2016 | Leonard et al. |
| 9,619,583 | B2 | 4/2017 | Lau et al. |
| 9,646,066 | B2 | 5/2017 | Olsen et al. |
| 9,652,776 | B2 | 5/2017 | Olsen et al. |
| 9,659,317 | B2 | 5/2017 | Naghmouchi et al. |
| 2003/0130861 | A1 | 7/2003 | Seitz |
| 2003/0220773 | A1* | 11/2003 | Haas ............... G06Q 10/0637 703/2 |
| 2004/0167789 | A1 | 8/2004 | Roberts et al. |
| 2004/0267676 | A1 | 12/2004 | Feng et al. |
| 2005/0071182 | A1 | 3/2005 | Aikens et al. |
| 2005/0131754 | A1* | 6/2005 | Chapman ............... G06Q 10/06 705/7.37 |
| 2005/0189415 | A1 | 9/2005 | Fano et al. |
| 2005/0278202 | A1 | 12/2005 | Broomhall et al. |
| 2006/0064370 | A1* | 3/2006 | Mojsilovic ............ G06Q 40/00 705/38 |
| 2006/0089866 | A1 | 4/2006 | Cheng et al. |
| 2006/0111973 | A1 | 5/2006 | Brown et al. |
| 2006/0129879 | A1 | 6/2006 | Alznauer et al. |
| 2007/0143171 | A1 | 6/2007 | Boyd et al. |
| 2008/0154796 | A1* | 6/2008 | Pallister ............... G06Q 20/102 705/36 R |
| 2008/0167928 | A1 | 7/2008 | Cao et al. |
| 2008/0313596 | A1* | 12/2008 | Kreamer ............... G06Q 10/06 717/101 |
| 2009/0012800 | A1 | 1/2009 | Devarakonda et al. |
| 2009/0030829 | A1* | 1/2009 | Chatter ............... G06Q 30/0206 705/37 |
| 2009/0192867 | A1* | 7/2009 | Farooq ............... G06Q 10/06 705/7.29 |
| 2009/0222297 | A1* | 9/2009 | Cao ............... G06Q 10/0635 705/400 |
| 2009/0240517 | A1 | 9/2009 | Pelter et al. |
| 2010/0235294 | A1 | 9/2010 | Raghupathy et al. |
| 2010/0250296 | A1 | 9/2010 | Channabasavaiah et al. |
| 2010/0262509 | A1 | 10/2010 | Delia et al. |
| 2010/0262548 | A1 | 10/2010 | Herbst et al. |
| 2011/0004509 | A1 | 1/2011 | Wu et al. |
| 2011/0066466 | A1 | 3/2011 | Narayanan |
| 2011/0218865 | A1 | 9/2011 | Muthukrishnan et al. |
| 2011/0238477 | A1 | 9/2011 | Urbankski |
| 2012/0029974 | A1* | 2/2012 | Councill ............ G06Q 30/0206 705/7.35 |
| 2012/0030199 | A1 | 2/2012 | Mohajer |
| 2012/0059680 | A1 | 3/2012 | Guthrie et al. |
| 2012/0059707 | A1* | 3/2012 | Goenka ............. G06Q 30/0242 705/14.41 |
| 2012/0072251 | A1 | 3/2012 | Mircean et al. |
| 2012/0232948 | A1 | 9/2012 | Wolf et al. |
| 2012/0290347 | A1 | 11/2012 | Elazouni et al. |
| 2012/0303491 | A1 | 11/2012 | Hill et al. |
| 2012/0317050 | A1 | 12/2012 | Bermuth |
| 2013/0054296 | A1 | 2/2013 | Gajakosh et al. |
| 2013/0166355 | A1 | 6/2013 | Mohanty et al. |
| 2013/0197993 | A1 | 8/2013 | Gao et al. |
| 2013/0218625 | A1 | 8/2013 | Duquette et al. |
| 2013/0246213 | A1 | 9/2013 | Lee et al. |
| 2013/0275085 | A1 | 10/2013 | Cheng et al. |
| 2013/0275181 | A1 | 10/2013 | Digioacchino et al. |
| 2013/0297412 | A1 | 11/2013 | Batra et al. |
| 2013/0332243 | A1 | 12/2013 | Gifford et al. |
| 2014/0006044 | A1* | 1/2014 | Pradhan ............. G06F 19/3443 705/2 |
| 2014/0006172 | A1* | 1/2014 | Pardoe ................ G06Q 30/08 705/14.71 |
| 2014/0052492 | A1 | 2/2014 | Boss et al. |
| 2014/0096140 | A1 | 4/2014 | Aquino et al. |
| 2014/0096249 | A1 | 4/2014 | Dupont et al. |
| 2014/0200999 | A1 | 7/2014 | Canny et al. |
| 2014/0222473 | A1 | 8/2014 | Patel et al. |
| 2014/0278808 | A1* | 9/2014 | Iyoob ................ G06Q 30/0206 705/7.35 |
| 2014/0310065 | A1* | 10/2014 | Chowdhary ....... G06Q 30/0283 705/7.35 |
| 2014/0337532 | A1* | 11/2014 | Arnette ................ G06F 9/4881 709/226 |
| 2015/0066598 | A1* | 3/2015 | Branch ............ G06Q 10/06375 705/7.37 |
| 2015/0081324 | A1* | 3/2015 | Adjaoute ........... G06Q 30/0185 705/2 |
| 2015/0100384 | A1 | 4/2015 | Ettl et al. |
| 2015/0193709 | A1 | 7/2015 | Ramesh Babu |
| 2016/0140789 | A1 | 5/2016 | Wickersham, III et al. |
| 2016/0148227 | A1 | 5/2016 | Choe et al. |
| 2016/0203506 | A1 | 7/2016 | Butler, IV et al. |
| 2016/0321331 | A1* | 11/2016 | Uchiumi ............... G06F 16/248 |
| 2017/0004408 | A1 | 1/2017 | Edelen et al. |
| 2017/0103451 | A1* | 4/2017 | Alipov ............. G06Q 30/0283 |
| 2017/0109212 | A1* | 4/2017 | Gaurav ............. G06F 9/45533 |
| 2018/0144314 | A1 | 5/2018 | Miller |
| 2019/0019148 | A1 | 1/2019 | Kumar et al. |

OTHER PUBLICATIONS

Akkiraju et al. "On Pricing Complex IT Service Solutions", 2014 Annual SRII Global Conference, Apr. 2014, p. 55-64—hereinafter Akkiraju (Year: 2014).*

Greenia et al. "A Win Prediction Model for IT Outsourcing Bids", 2014 Annual SRII Global Conference, 2014-16, p. 39-42—hereinafter Greenia (Year: 2014).*

Wu Ming, Yang Jian and Ran Yongyi, "Dynamic instance provisioning strategy in an Iaas cloud," Proceedings of the 32nd Chinese Control Conference, 2013, pp. 6670-6675 (Year: 2013).*

Lee, H. et al., "Enterprise Architecture Content Model Applied to Complexity Management while Delivering IT Services", Proceedings of the 2014 IEEE International Conference on Services Computing (SCC), Jun. 27, 2014-Jul. 2, 2014, pp. 408-415, IEEE, United States.

Megahed, A. et al., "Pricing IT Services Deals: A More Agile Top-Down Approach", for publication in Nov. 2015 at 2015 ICSOC Conference, pp. 1-4, Goa, India.

Anonymous, "Method and System for Providing a Proactive Backup for Value-Added Information Technology (IT) Service Delivery Requirements", Dec. 2, 2014, pp. 1-5, IP.com, United States.

Anonymous, "Methods and Systems for Adaptive Management and Dynamic Pricing of Information Technology Services", Feb. 25, 2013, pp. 1-4, IP.com, United States.

Anonymous, "Dynamic pricing of web services", Jun. 18, 2012, pp. 1-4, IP.com, United States.

Greenia, D.B. et al., "A Win Prediction Model for IT Outsourcing Bids", Service Research and Innovation Institute Global Conference, Apr. 2014, pp. 1-5, ResearchGate, United States.

Akkiraju, R. et al., "On Pricing Complex IT Service Solutions", Proceedings of the 2014 Annual SRII Global Conference (SRII '14), Apr. 23, 2014, pp. 55-64, IEEE Computer Society, United States.

(56) References Cited

OTHER PUBLICATIONS

Agarwal, D. et al., "fLDA: Matrix Factorization through Latent Dirichlet Allocation", Proceedings of the 3rd ACM International Conference on Web Search and Data Mining (WSDM'10), Feb. 4, 2010, pp. 91-100, ACM, United States.
Suri, P.K. et al., "Estimating the Probability of Project Completion by SIM_DEL Estimator", Proceedings of the International Journal of Computer Science and Information Technologies (IJCSIT), Aug. 2012, pp. 4938-4945, vol. 3 (4), ISSN: 0975-9646, United States.
Carman, S. et al., "Predictive Value of Comments in the Service Engagement Process", Proceedings of the American Society for Information Science and Technology (ASIST), 2012, pp. 1-12, vol. 49, United States.
Greenia, D.B. et al., "A Win Prediction Model for IT Outsourcing Bids", Proceedings of the SRII Global Conference, Apr. 2014, pp. 1-5, ResearchGate, United States.
Yan, J. et al., "On Machine Learning towards Predictive Sales Pipeline Analytics", Proceedings of the 29th AAAI Conference on Artificial Intelligence, 2015, pp. 1945-1951, United States.
Motahari Nezhad, H.R. et al., "Health identification and outcome prediction for outsourcing services based on textual comments", Proceedings of 2014 IEEE International Conference on Services Computing (SCC), Jun. 27, 2014-Jul. 2, 2014, pp. 155-162, IEEE, United States.
List of IBM Patents or Patent Applications Treated as Related Form. IBM, "Auto-Configuring Clusters Through Presence Based Discovery," IP.com Feb. 6, 2007, pp. 1-3, United States.
Mell, P., et al., "The NIST Definition of Cloud Computing", National Institute of Standards and Technology Special Publication 800-145, Sep. 2011, pp. 1-7, U.S. Department of Commerce, United States.
PR Newswire, "EDS Signs Contract With United Airlines to Upgrade Computer Systems and Service to Reduce IT Costs," Jan. 17, 2006, pp. 1-2, Electronic Data Systems Corporation, United States.
Business Wire, "DataDirect Technologies Helps Subaru Reduce IT Support Costs and Improve Customer Service," Nov. 2001, pp. 1-2, Rockville, United States.
Rai, V.K., et al., "A Systemic and Relational Approach to Pricing Services," Service Science, Mar. 2016, pp. 37-58, vol. 8, No. 1, Institute for Operations Research and the Management Sciences (INFORMS), Maryland, United States.
Gaivoronski, A.A., et al., "Risk-Balanced Dimensioning and Pricing of End-to-End Differentiated Services," European Journal of Operational Research, 2016, pp. 644-655, vol. 254, No. 2, Elsevier B.V., Netherlands.
Gajananan, K., et al., "A Method for Estimating Annual Unit Cost Reduction of IT Service Deals", Submitted for Publication at the 50th Hawaii International Conference on System Sciences (HICCS), 2017, pp. 1-9, United States.
Megahed, A., et al., "Top-Down Pricing of IT Services Deals with Recommendation for Missing Values of Historical and Market Data", Submitted for Publication at the 14th International Conference on Service Oriented Computing (ICSOC), 2016, pp. 1-15, United States.
Gajananan, K., et al., "A Top-Down Pricing Algorithm for IT Service Contracts Using Lower Level Service Data", In Proceedings of the 13th IEEE International Conference on Services Computing (SCC), Jun. 2016, pp. 720-727, IEEE, United States.
Megahed, A., et al., "Modeling Business Insights into Predictive Analytics for the Outcome of IT Service Contracts", In Proceedings of the 12th IEEE International Conference on Services Computing (SCC), Jun. 2015, pp. 515-521, IEEE, United States [Abstract Only].

Anonymous, "Method for Cloud and Cloud-Service Selection", IP.com, May 13, 2011, pp. 1-8, United States.
EIC 3600 Search Report dated Jul. 16, 2018 for Case Serial No. 15192892 from Scientific and Technical Information Center, pp. 1-21, United States.
EIC 3600 Search Report dated Jul. 24, 2018 for Case Serial No. 15192892 from Scientific and Technical Information Center, pp. 1-10, United States.
List of IBM Patents or Patent Applications Treated as Related Form; Firth, M.K., U.S. Appl. No. 16/224,595, filed Dec. 18, 2018.
Lakoff, G., et al. "Metaphors We Live by," 1980, pp. ix-55, University of Chicago Press, Chicago, United States.
Edelman, S., "Computing the Mind," 2008, pp. xi-36, Oxford University Press, New York, United States.
Murphy, K.P., "Machine Learning, a Probabilistic Perspective," 2012, pp. 947-956. MIT Press, United States [Abstract Only].
Goffman, E., "Frame Analysis: An Essay on the Organization of Experience," 1974, pp. 1-39, 301-344, Northeastern University Press, United States [Abstract Only].
Bussey, P. et al., "Bid Pricing—Calculating the Possibility of Winning", IEEE International Conference on Systems, Man, and Cybernetics. Computational Cybernetics and Simulation, Oct. 12, 1997, vol. 4, pp. 3615-3620, IEEE, United Kingdom.
Soni, A. et al., "Pricing schemes in cloud computing: a review", International Journal of Advanced Computer Research, Mar. 1, 2017, vol. 7, No. 29, pp. 60-70, United States.
Van Dam, K.H. et al., eds. "Agent-based modelling of socio-technical systems", Science & Business Media, Oct. 8, 2012, vol. 9, Springer.
Grier, D.A., "When computers were human", Princeton University Press, Nov. 1, 2013.
Hayles, N.K., "My mother was a computer: Digital subjects and literary texts" University of Chicago Press, Mar. 15, 2010.
Treffert, D.A. et al., "Islands of genius", Scientific American, vol. 286, No. 6, pp. 76-85, Jun. 1, 2002.
Mindell, D.A. et al., "Our robots, ourselves: Robotics and the muths of autonomy", Viking Adult, 2015.
EIC 3600 Search Report dated Mar. 31, 2020 for Case Serial No. 16224595 from Scientific and Technical Information Center, pp. 1-38, United States.
List of IBM Patents or Patent Applications Treated as Related Form; Fukuda, M. U.S. Appl. No. 15/192,875, filed Jun. 24, 2016; Firth, M.K., U.S. Appl. No. 15/192,892, filed Jun. 24, 2016; Firth, M.K., U.S. Appl. No. 16/224,595, filed Dec. 18, 2018; Megahed, A., U.S. Appl. No. 14/960,242, filed Dec. 4, 2015; Fukuda, M.A., U.S. Appl. No. 17/153,076, filed Jan. 20, 2021. List of IBM Patents or Patent Applications Treated as Related Form; Fukuda, M., U.S. Appl. No. 15/192,884, filed Jun. 24, 2016; Asthana, S., U.S. Appl. No. 15/860,192, filed Jan. 2, 2018, Asthana, S., U.S. Appl. No. 15/860,213, filed Jan. 2, 2018.
Malensek, M. et al., "Using Distributed Analytics to Enable Real-Time Exploration of Discrete Event Simulations", IEEE/ACM 7th International Conference on Utility and Cloud Computing, 2014, vol. 4, pp. 49-58, IEEE, United Kingdom.
Akkiraju, R. et al., "On the Role of Analytics in Estimating the Cost of Delivering Complex Information Technology (IT) Outsourcing Services Projects", 2021 Anunal SRII Global Conference, Jul. 2012, pp. 705-714, United States.
Kansal et al., "Pricing Models in Cloud Computing", Proceedings of the 2014 International Conference on Information and Commnication Technology for Competitive Strategies, Oct. 2014, pp. 1-5, United States.

* cited by examiner

| r_test_labels | r_pred A | B | C | D | Row Total |
|---|---|---|---|---|---|
| A | 23<br>0.742<br>0.676<br>0.280 | 7<br>0.226<br>0.226<br>0.085 | 1<br>0.032<br>0.071<br>0.012 | 0<br>0.000<br>0.000<br>0.000 | 31<br>0.378 |
| B | 7<br>0.269<br>0.206<br>0.085 | 15<br>0.577<br>0.484<br>0.183 | 4<br>0.154<br>0.286<br>0.049 | 0<br>0.000<br>0.000<br>0.000 | 26<br>0.317 |
| C | 3<br>0.200<br>0.088<br>0.037 | 5<br>0.333<br>0.161<br>0.061 | 6<br>0.400<br>0.429<br>0.073 | 1<br>0.067<br>0.333<br>0.012 | 15<br>0.183 |
| D | 1<br>0.100<br>0.029<br>0.012 | 4<br>0.400<br>0.129<br>0.049 | 3<br>0.300<br>0.214<br>0.037 | 2<br>0.200<br>0.667<br>0.024 | 10<br>0.122 |
| Column Total | 34<br>0.415 | 31<br>0.378 | 14<br>0.171 | 3<br>0.037 | 82 |

Cell Contents
| N |
| N / Row Total |
| N / Col Total |
| N / Table Total |

Total Observations in Table: 82

Prediction

| Test Samples | A | B | C | D |
|---|---|---|---|---|
| A | 67.6% | 22.6% | 7.1% | 0.0% |
| B | 20.6% | 48.4% | 28.6% | 0.0% |
| C | 8.8% | 16.1% | 42.9% | 33.3% |
| D | 2.9% | 12.9% | 21.4% | 66.7% |

EFFECTIVENESS OF SERVICE COMPLEXITY CONFIGURATIONS IN TOP-DOWN COMPLEX SERVICES DESIGN

The present invention generally relates to services design, and more particularly, to a system, method and computer program product for transforming a diverse, initial range of historic peer cost data relating to one or more services to a narrower range of historic peer cost data for use in estimating a cost of a client solution including the one or more services with improved accuracy.

BACKGROUND

A solution designer for a service provider designs client solutions for clients. A client solution for a client is a customized solution including one or more services. For example, a solution designer for an Information Technology (IT) service provider may design a client solution including complex IT services (e.g., End User, Service Desk, Enterprise Security, etc.).

SUMMARY

One embodiment provides a method comprising receiving a set of historic peer deals relating to one or more services, and, for each service, a corresponding baseline and a corresponding cost percentage estimation for the service. The set of historic peer deals are maintained on at least one hardware storage device. For each service, historic peer cost data for the service is clustered to form at least one corresponding cluster. Each cluster includes similar unit costs, and has an assigned label. The method further comprises training a classification model based on each baseline received, each cost percentage estimation received, and each assigned label. For each assigned label, a corresponding probability distribution is computed based on the classification model. The method further comprises receiving a new client solution comprising at least one of the one or more services. For each service of the new client solution, an assigned label for the service is predicted based on the classification model, and, based on a probability distribution corresponding to the assigned label predicted for the service, an initial range of historic peer cost data relating to the service is transformed into a narrower range of historic peer cost data for use in estimating a cost of the service with improved accuracy.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to services design, and more particularly, to a system, method and computer program product for transforming a diverse, initial range of historic peer cost data relating to one or more services to a narrower range of historic peer cost data for use in estimating a cost of a client solution including the one or more services with improved accuracy. One embodiment provides a method comprising receiving a set of historic peer deals relating to one or more services, and, for each service, a corresponding baseline and a corresponding cost percentage estimation for the service. The set of historic peer deals are maintained on at least one hardware storage device. For each service, historic peer cost data for the service is clustered to form at least one corresponding cluster. Each cluster includes similar unit costs, and has an assigned label. The method further comprises training a classification model based on each baseline received, each cost percentage estimation received, and each assigned label. For each assigned label, a corresponding probability distribution is computed based on the classification model. The method further comprises receiving a new client solution comprising at least one of the one or more services. For each service of the new client solution, an assigned label for the service is predicted based on the classification model, and, based on a probability distribution corresponding to the assigned label predicted for the service, an initial range of historic peer cost data relating to the service is transformed into a narrower range of historic peer cost data for use in estimating a cost of the service with improved accuracy.

Figure 3:
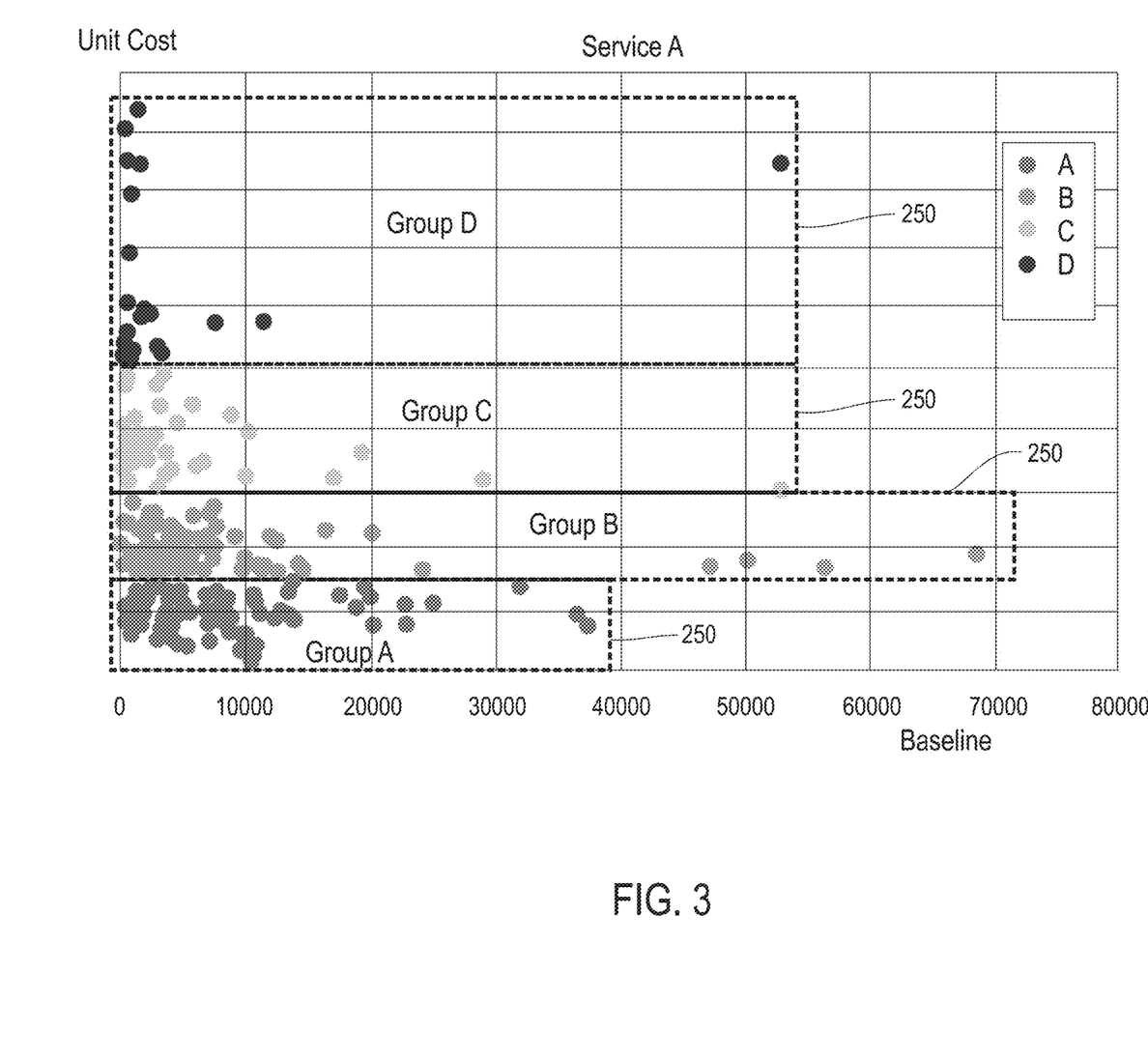
FIG. 3 illustrates one or more example clusters for a service, in accordance with an embodiment of the invention.

A problem that arises in service design is that unit costs data mined from historic peer deals (e.g., different unit costs represented by dots of different shades in FIG. 3) are typically very diverse, resulting in an inaccurate cost estimation when a user (e.g., a solution designer) changes a percentile range of unit cost estimation for a service. Embodiments of the invention provide a solution that improves accuracy of unit cost estimation for a service.

Figure 1:
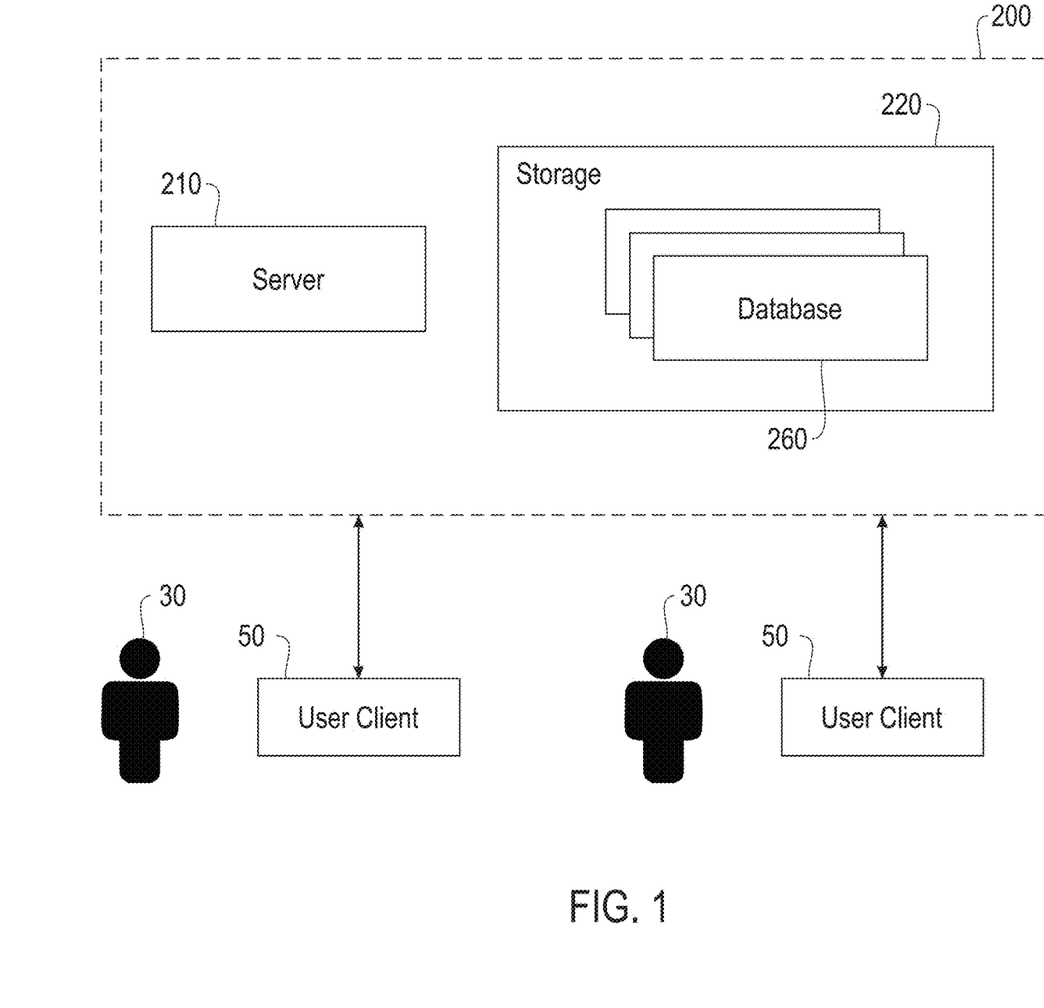
FIG. 1 illustrates an example system, in accordance with an embodiment of the invention.

FIG. 1 illustrates an example system 200, in accordance with an embodiment of the invention. The system 200 comprises one or more server devices 210, and one or more storage devices 220. The storage devices 220 maintain one or more databases 260. As described in detail later herein, one or more application units may execute/operate on the server devices 210 to transform a diverse, initial range of historic peer cost data relating to one or more services to a narrower range of historic peer cost data for use in estimating a cost of a client solution including the one or more services with improved accuracy.

A user client 30 (e.g., a solution designer) may access the system 200 using an electronic user client device 50, such as a personal computer, or a mobile device (e.g., a laptop computer, a tablet, a mobile phone, etc.). In one embodiment, each user client device 50 exchanges data with the system 200 over a connection (e.g., a wireless connection, a wired connection, or a combination of the two).

Figure 2:
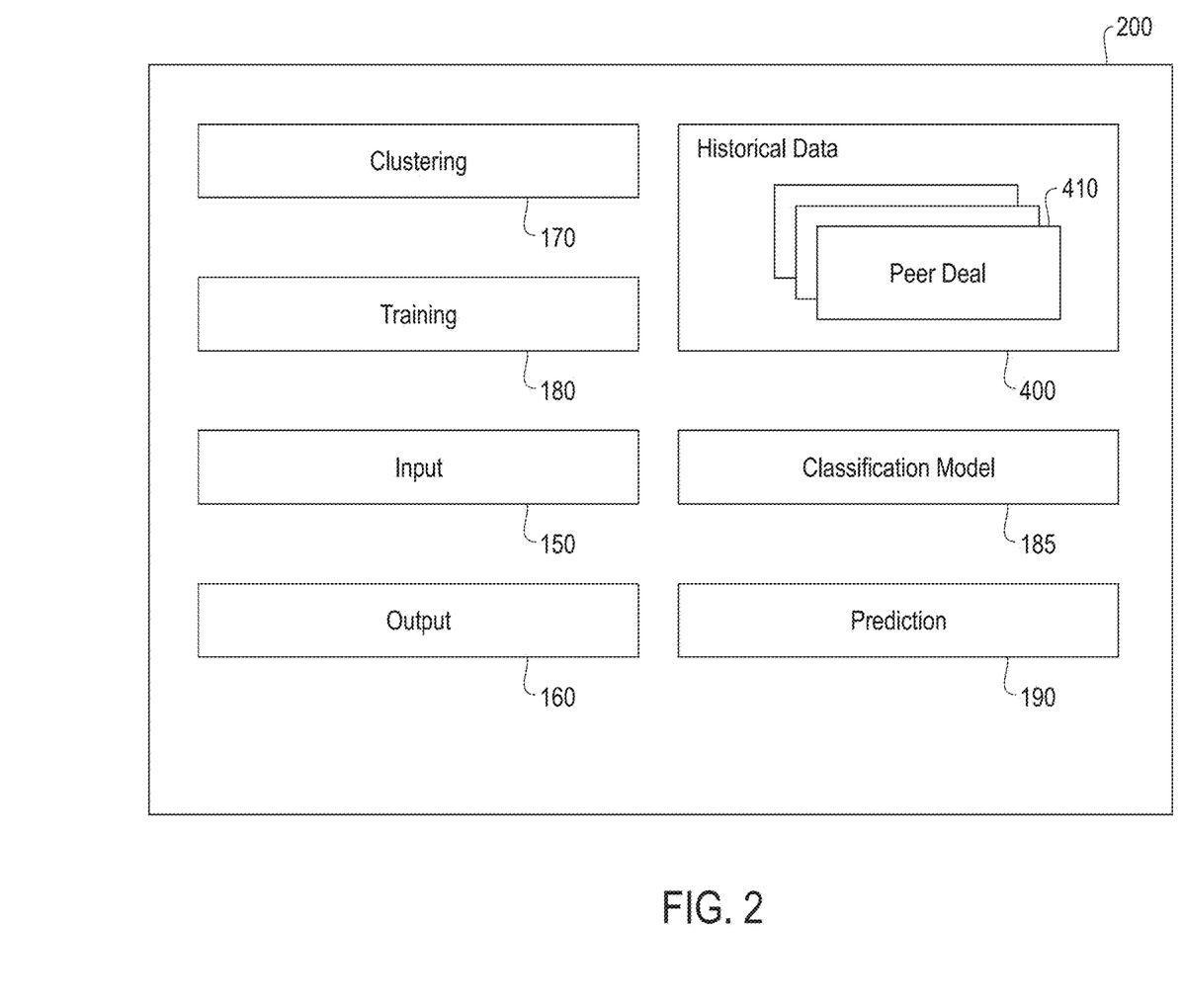
FIG. 2 illustrates the system in detail, in accordance with an embodiment of the invention.

FIG. 2 illustrates the system 200 in detail, in accordance with an embodiment of the invention. The system 200 comprises an input interface 150 configured to receive, as input, each of the following: (1) a collection 400 of data sets 410 for historic peer deals relating to one or more services, (2) for each service, a specified baseline (i.e., quantity) for the service, and (3) for each service, a specified cost percentage estimation for the service. Each data set 410 corresponds to a historic peer deal, and comprises observed/actual data for the historic peer deal, such as actual historic cost data for one or more services included in the historic peer deal. Each input received may be user-specified. The collection 400 comprises a diverse, initial range of historic peer cost data.

In one embodiment, the collection 400 may be maintained on at least one database 260 (FIG. 1) of the storage devices 220 (FIG. 1).

The system 200 further comprises an output interface 160 configured to provide, as output, each of the following: (1) for each service, a percentile range that narrows historic peer cost data for the service. Each percentile range for each service may be used to determine cost estimates of a client solution including the service with increased accuracy.

The system 200 further comprises a clustering unit 170. As described in detail herein, for each service, the clustering unit 170 is configured to generate, for the service, one or more clusters 250 (FIG. 3) within the collection 400, wherein each cluster 250 has similar/close unit costs. For each cluster, historic peer deals included in the cluster are assigned a corresponding label.

The system 200 further comprises a training unit 180. The training unit 180 is configured to apply known supervised machine learning techniques to generate a classification model 185. The classification model 185 is trained to classify the historic peer deals into different clusters based on the input received by the system 200 and labels corresponding to clusters including similar unit costs. Specifically, the training unit 180 trains the classification model 185 (i.e., in a training stage) for use in computing, for each service, a corresponding probability distribution representing a prediction of actual historic cost data included in a cluster for the service based on test samples indicating complexity of the service, where the corresponding probability distribution is used to narrow historic peer cost data for the service. The training unit 180 is configured to receive, as input, each of the following: (1) for each service, a specified baseline (i.e., quantity) for the service, and (2) for each service, a specified cost percentage estimation for the service. The training unit 180 is configured to provide, as output, the classification model 185.

The system 200 further comprises a prediction unit 190. Using the classification model 185, the prediction unit 190 is configured to compute, for each service, at least one probability distribution. Each probability distribution computed for the service corresponds to a label assigned to a cluster 250 corresponding to the service, and represents a prediction of actual historic cost data included in the cluster 250 based on test samples indicating complexity of the service. The prediction unit 190 is further configured to, for each service of a new client solution, use a probability distribution computed for the service to transform a diverse, initial range of peer historic cost data relating to the service into a narrower range for use in determining cost estimations for the service with increased accuracy. The narrower range may be used in improving effectiveness of a service complexity configuration in a top-down complex service design.

In one embodiment, the system 200 operates as follows: first, an appropriate existing classification model 185 for predicting service complexity of one or more services is selected based on input received by the system 200 (e.g., user input). The input received by the system 200 comprises: (1) a set of historic peer deals relating to the one or more services, (2) for each service, a corresponding baseline, and (3) for each service, a corresponding cost structure estimation (i.e., cost percentage estimation against total scenario cost).

The system 200 then obtains peer historic cost data for each service from the collection 400, and applies a clustering algorithm (e.g., K-means) to cluster the data for the service to form several corresponding clusters 250 (FIG. 3). Each cluster 250 has a corresponding label; historic peer deals included in the cluster are assigned the corresponding label.

The system 200 then trains a classification model 185 using a machine learning algorithm (e.g., KNN algorithm), the input received by the system 200, and labels corresponding to clusters 250 including similar unit costs. The system 200 operates on the assumption that historic peer deals and client scenarios having similar cost structure and baseline configurations among all services are more likely to have similar service complexity for the services.

For each label assigned to each cluster corresponding to each service, the system 200 uses the classification model to compute a corresponding probability distribution representing a prediction of actual historic cost data included in the cluster. A probability distribution corresponding to a label assigned to a cluster may be used to determine probabilities of positive test samples included in the cluster.

The system 200 is further configured to receive, as input, each of the following: (a) a new client solution comprising one or more services, and (2) for each service of the new client solution, a corresponding set of selected historic peer deals. The system 200 is further configured to, for each service of the new client solution, (1) obtain an initial range of historic peer cost data relating to the service, (2) use the trained classification model 185 to predict a label for the service, where the predicted label is a label assigned to a cluster corresponding to the service, (3) select a probability distribution corresponding the predicted label, and (4) use the probability distribution corresponding to the predicted label to transform the initial range of historic peer cost data relating to the service to a narrower range for use in estimating a cost of the service with improved accuracy.

FIG. 3 illustrates one or more example clusters 250 for a service, in accordance with an embodiment of the invention. In one embodiment, the system 200 applies a K-means algorithm to cluster each service into multiple clusters 250. In another embodiment, another clustering algorithm may be applied instead.

For example, as shown in FIG. 3, for Service A, the clustering unit 170 of the system 200 clusters Service A into four different clusters: (1) a first cluster 250 denoted as Group A comprising historic peer deals having the lowest unit costs (i.e., from a minimum value to 150), (2) a second cluster 250 denoted as Group B comprising historic peer deals having unit costs in the range of 150 to 300, (3) a third cluster 250 denoted as Group C comprising historic peer deals having unit costs in the range of 300 to 510, and (4) a fourth cluster 250 denoted as Group D comprising historic peer deals having the highest unit costs (i.e., from 510 to a maximum value).

Figure 4:
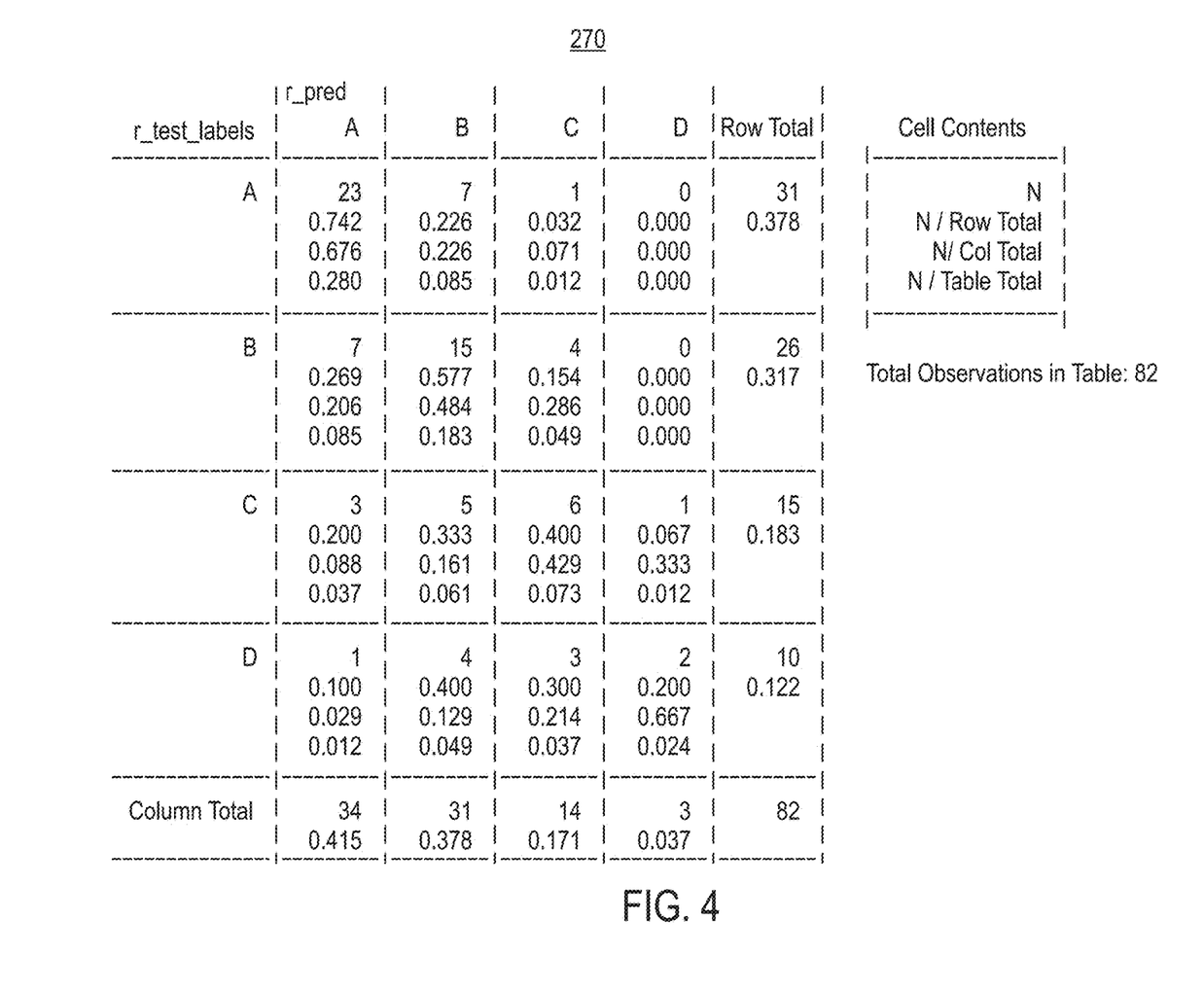
FIG. 4 illustrates an example table for the clusters in FIG. 3, in accordance with an embodiment of the invention.

FIG. 4 illustrates an example table 270 for the clusters 250 in FIG. 3, in accordance with an embodiment of the invention. The table 270 comprises information identifying cost structure and baseline features for each cluster 250 (i.e., Group A, Group B, Group C and Group D).

In one embodiment, the training unit 180 of the system 200 applies a KNN algorithm and receives each of the following features (e.g., obtained from the table 270) as input: (1) a list of normalized cost percentage for each service included in a client solution, and (2) a list of baselines for each service included in the client solution. Labels for the historic peer deals may be identified by the clusters 250 created (e.g., A, B, C and D corresponding to Group A, Group B, Group C and Group D, respectively). In another embodiment, another algorithm may be applied instead.

For each service, the system 200 produces a corresponding cross table 275 (FIG. 5) of prediction results for each cluster 250 for the service based on both positive test samples and negative test samples indicating service complexity of the service. The cross table 275 is an example classification performance result of the classification model 185 based on the positive test samples and the negative test samples; the cross table 275 may be used to indicate performance of the classification model 185 trained by the training unit 180.

Figure 5:
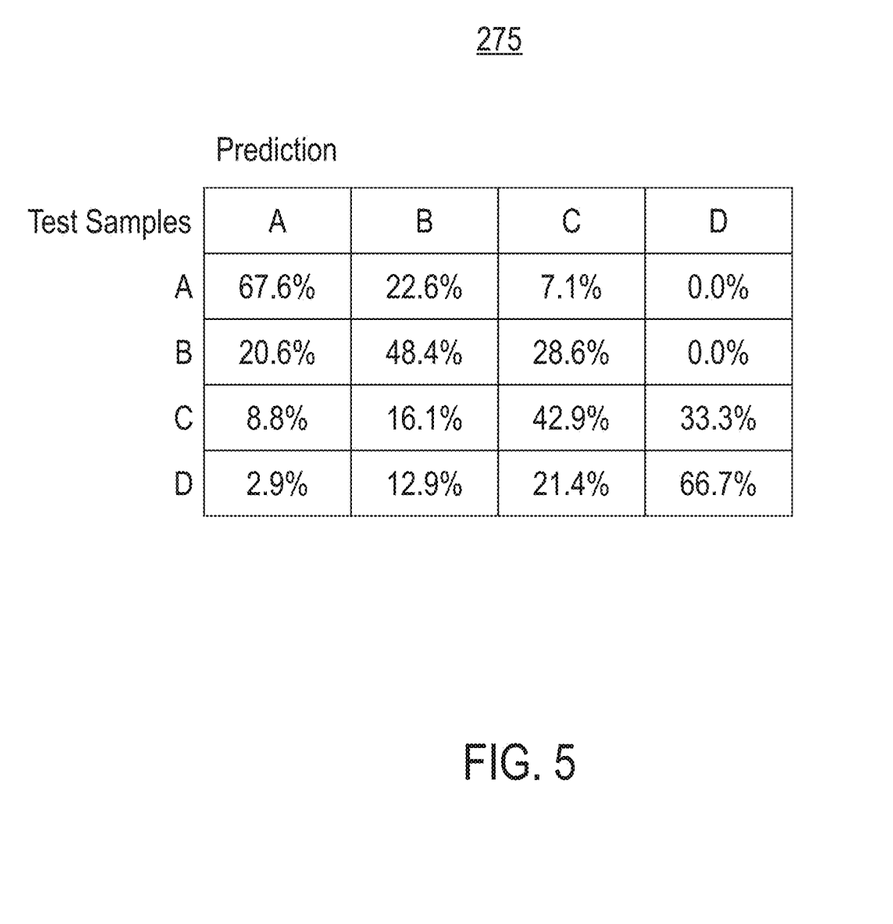
FIG. 5 illustrates an example cross table of prediction results for each cluster in FIG. 3, in accordance with an embodiment of the invention.

FIG. 5 illustrates an example cross table 275 of prediction results for each cluster 250 in FIG. 3, in accordance with an embodiment of the invention. The system 200 produces the cross table 275 of prediction results for each cluster 250 in FIG. 3 based on both positive test samples and negative test samples indicating service complexity of Service A. As shown in FIG. 5, a positive test sample has the highest prediction result, and the prediction results decrease relative to the distance of the unit cost of clusters 250. The information included in the cross table 275 is obtained directly from table 270 in FIG. 4.

Figure 6:
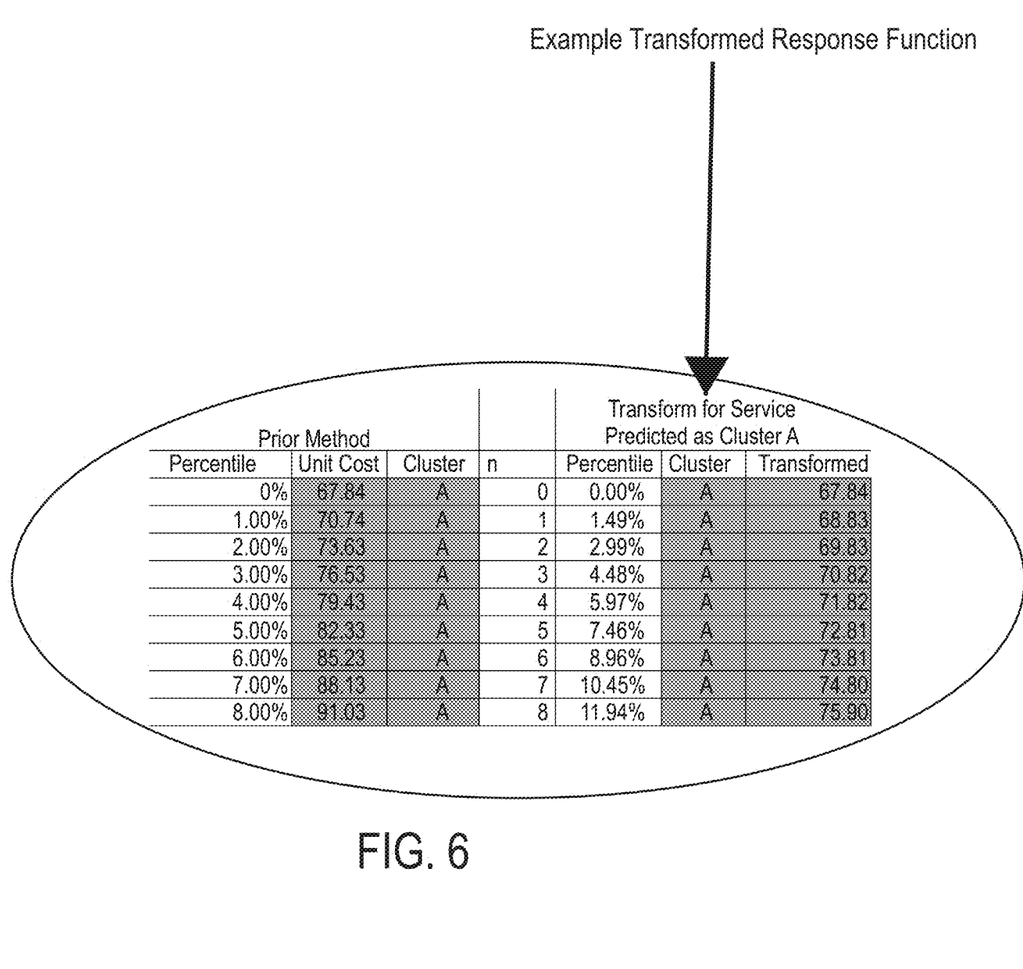
FIG. 6 illustrates an example transformation of a diverse, initial range of historic peer cost data for a service into a narrower range based on a probability distribution representing prediction of actual historic cost data included in a cluster for the service, in accordance with an embodiment of the invention.

FIG. 6 illustrates an example transformation of a diverse, initial range of historic peer cost data for a service into a narrower range based on a probability distribution representing a prediction of actual historic cost data included in a cluster 250 for the service, in accordance with an embodiment of the invention. The system 200 uses unit costs included in a cluster 250 for the service to generate a transformed response function. Specifically, for each label corresponding to each cluster 250 for the service, the system 200 orders a small amount (e.g., 10) of historic peer deals selected for the service by unit costs, and generates a larger sized list (e.g., 100) of unit costs for the label by applying a percentile function such that a relative size of the label is maintained. For each service, a relative size of each label corresponding to each cluster for the service is transformed in accordance to a prediction result for the label. For each service, a percentile function is applied again for entries of each label corresponding to each cluster for the service when a relative size of the label is transformed; the result represents a transformed response function.

Figure 7:
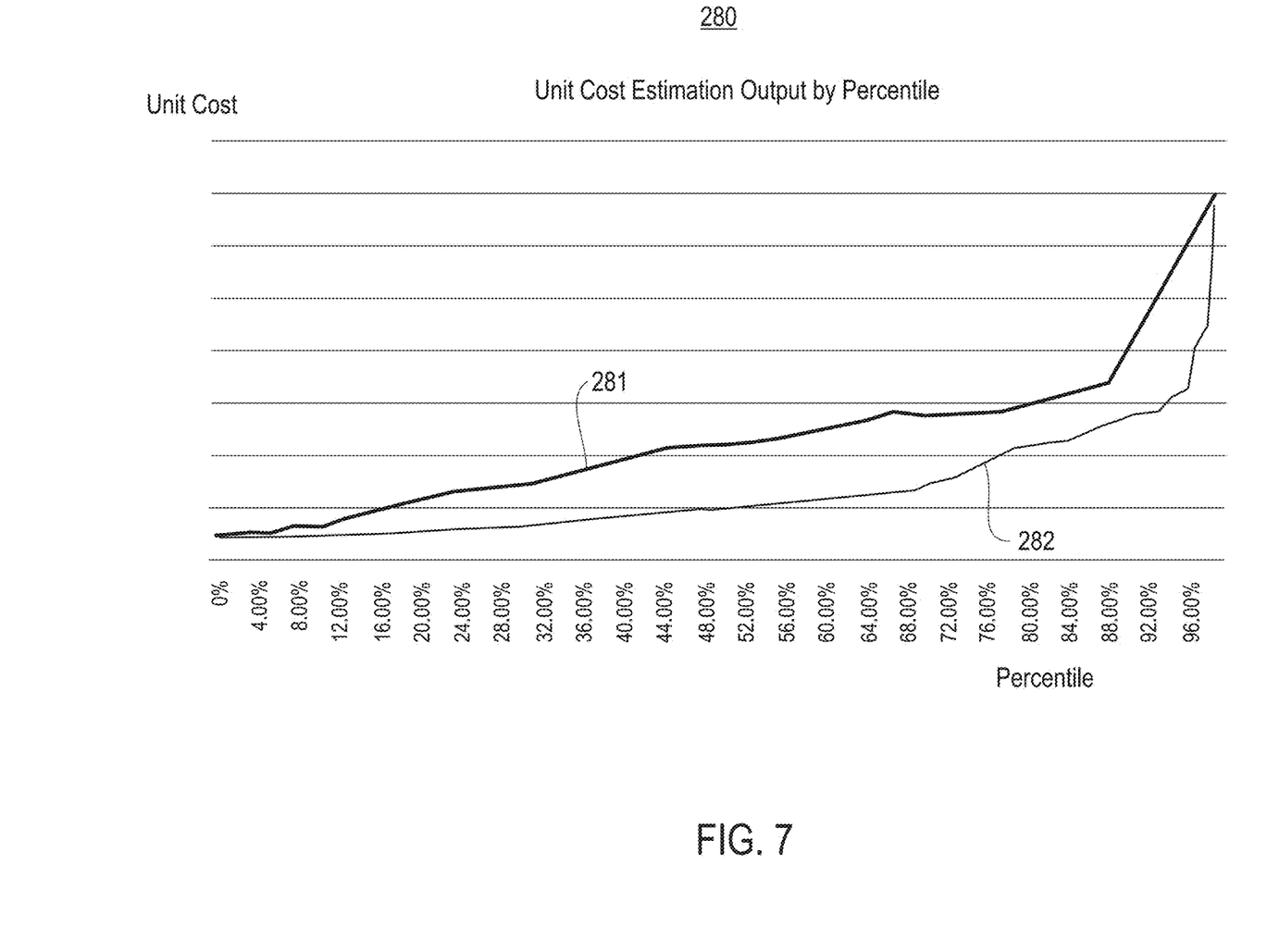
FIG. 7 illustrates an example table providing unit cost estimation for a service, in accordance with an embodiment of the invention.

FIG. 7 illustrates an example table 280 providing unit cost estimation for a service (e.g., Service A), in accordance with an embodiment of the invention. Based on the cross table 275 in FIG. 5, the system 200 is configured transform a diverse, initial range 281 of historic peer cost data for Service A into a narrower range 282. The narrower range may 282 be used in determining cost estimations for the client solution with increased accuracy.

Figure 8:
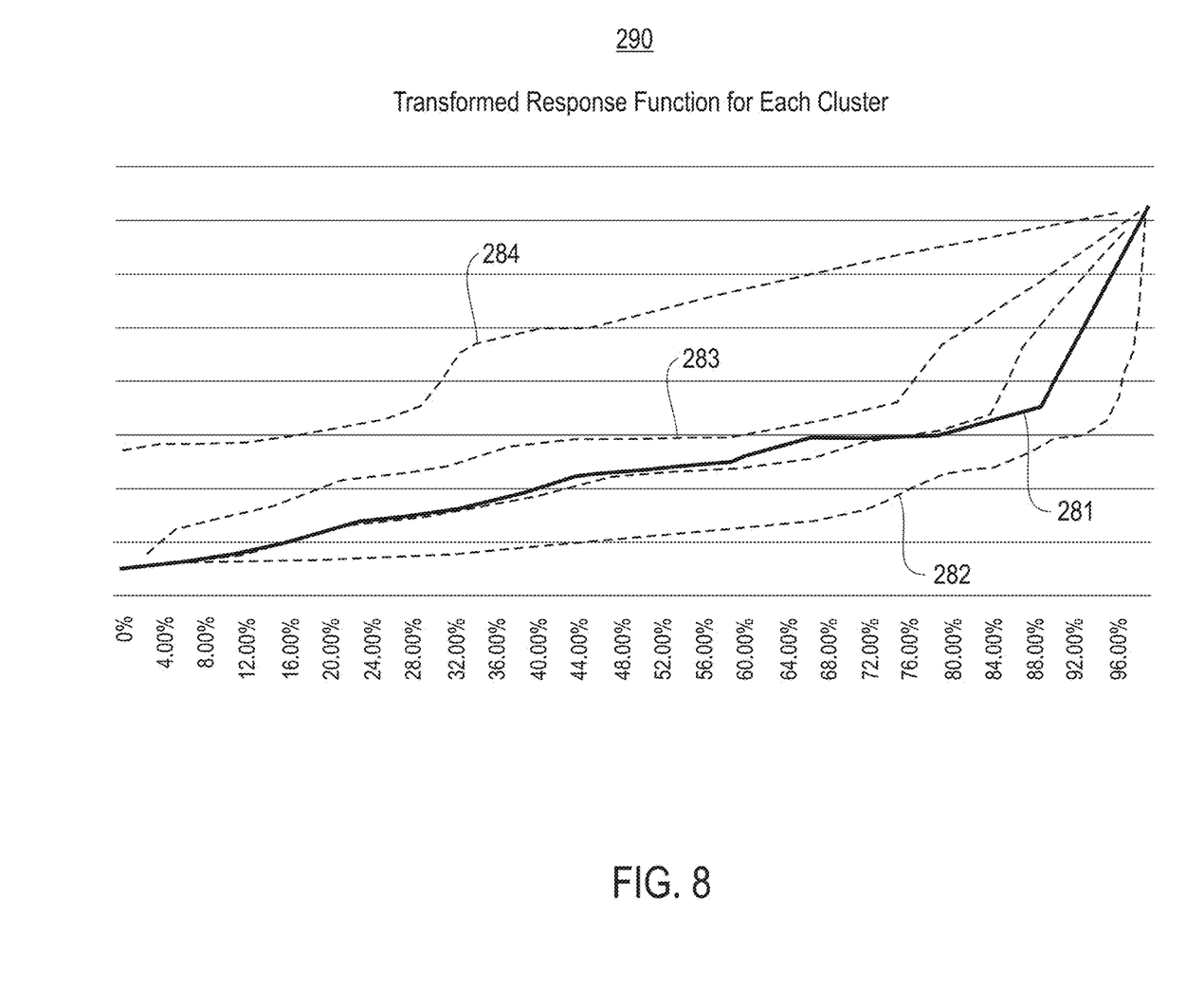
FIG. 8 illustrates an example table providing different percentile ranges of unit cost estimation for a service, in accordance with an embodiment of the invention.

FIG. 8 illustrates an example table 290 providing different percentile ranges of unit cost estimation for a service (e.g., Service A), in accordance with an embodiment of the invention. In one embodiment, different transformed response functions may be used for each service according to a predicted service complexity. As shown in FIG. 8, if the predicted service complexity is low, a transformed response function may be used to obtain the narrower range 282. If the predicted service complexity is higher than low, one or more other transformed response functions may be used to obtain one or more other narrower ranges (e.g., range 283, range 284, etc.).

Figure 9:
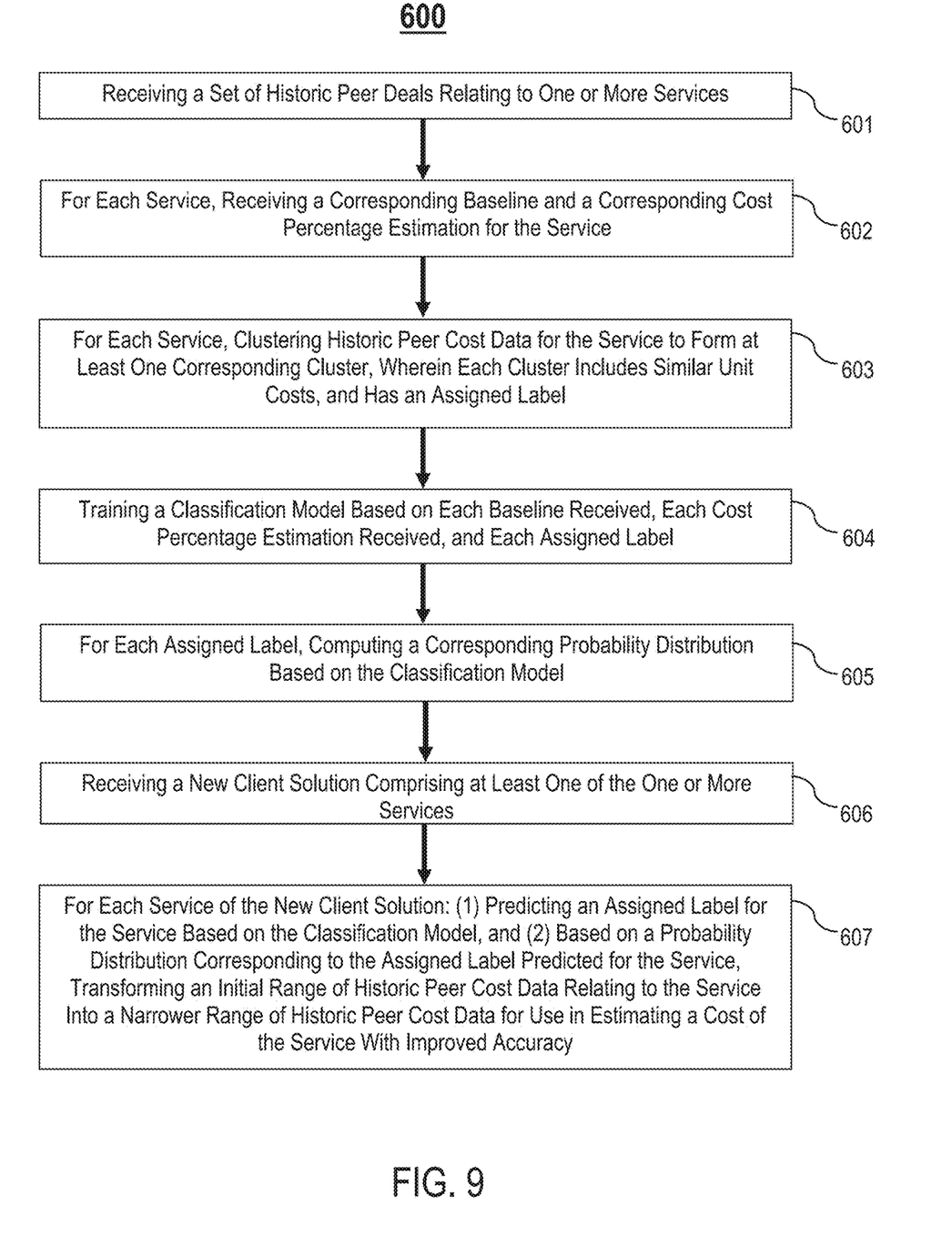
FIG. 9 illustrates a flowchart of an example process for transforming a diverse, initial range of historic peer cost data relating to one or more services to a narrower range of historic peer cost data for use in estimating a cost of a client solution including the one or more services with improved accuracy, in accordance with an embodiment of the present invention.

FIG. 9 illustrates a flowchart of an example process 600 for transforming a diverse, initial range of historic peer cost data relating to one or more services to a narrower range of historic peer cost data for use in estimating a cost of a client solution including the one or more services with improved accuracy, in accordance with an embodiment of the present invention. In process block 601, receive a set of historic peer deals relating to one or more services. In process block 602, for each service, receive a corresponding baseline and a corresponding cost percentage estimation for the service. In process block 603, for each service, cluster historic peer cost data for the service to form at least one corresponding cluster, wherein each cluster includes similar unit costs, and has an assigned label. In process block 604, train a classification model based on each baseline received, each cost percentage estimation received, and each assigned label. In process block 605, for each assigned label, compute a corresponding probability distribution based on the classification model. In process block 606, receive a new client solution comprising at least one of the one or more services. In process block 607, for each service of the new client solution, predict an assigned label for the service based on the classification model, and, based on a probability distribution corresponding to the assigned label predicted for the service, transform an initial range of historic peer cost data relating to the service into a narrower range of historic peer cost data for use in estimating a cost of the service with improved accuracy.

In one embodiment, process blocks 601-607 may be performed by one or more components of the system 200.

Figure 10:
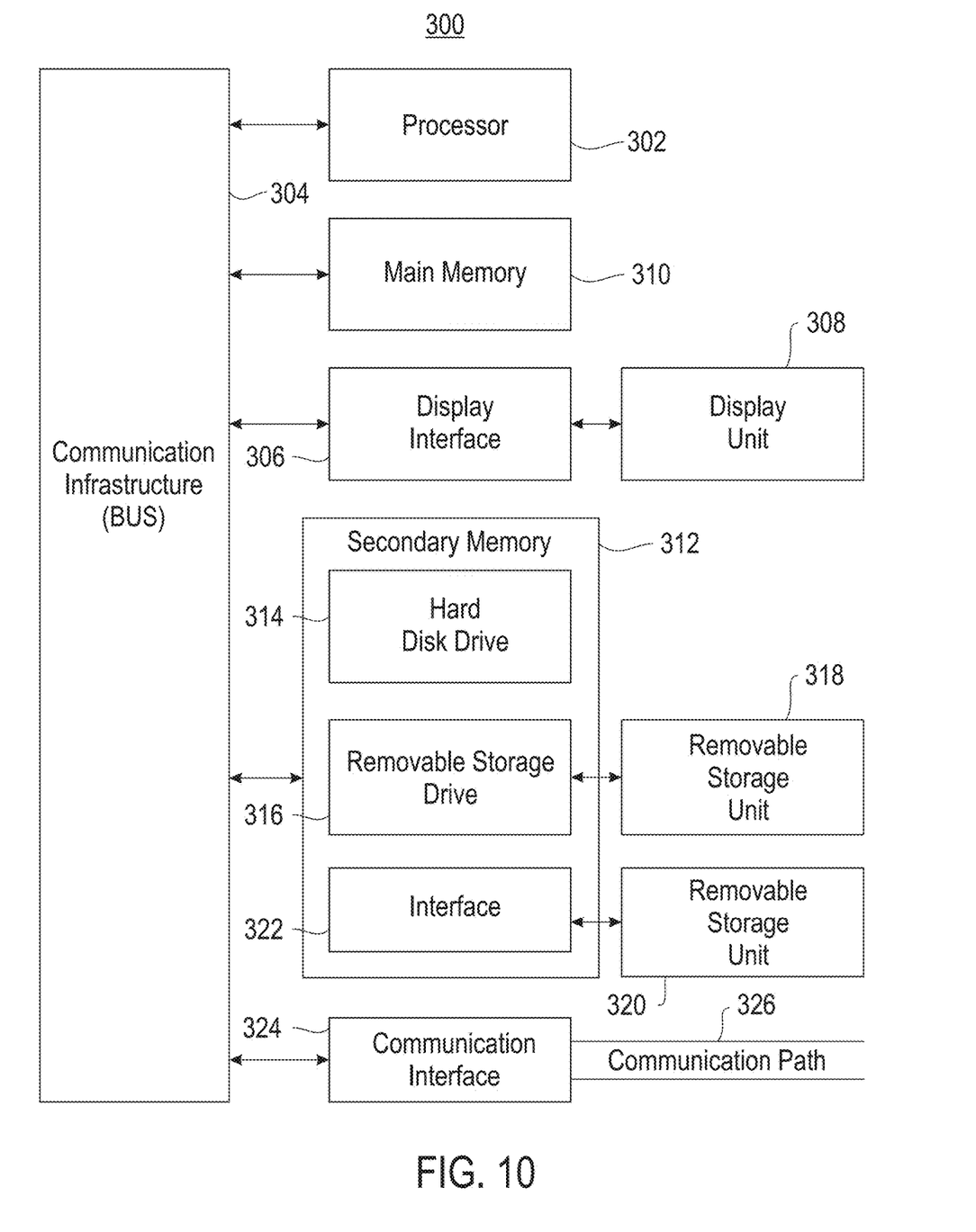
FIG. 10 is a high level block diagram showing an information processing system useful for implementing an embodiment of the present invention.

FIG. 10 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving a set of historic peer deals relating to one or more services, wherein the set of historic peer deals is maintained on at least one hardware storage device, and the set of historic peer deals comprises actual historic cost data for each of the one or more services;
for each of the one or more services, receiving a corresponding baseline and a corresponding cost percentage estimation for the service, wherein the corresponding baseline is indicative of a quantity for the service;
for each of the one or more services, clustering actual historic cost data for the service to form at least one corresponding cluster, wherein each cluster includes similar unit costs and is assigned a corresponding label;
training, on a server device, a classification model to classify the set of historic peer deals into different clusters by applying a supervised machine learning algorithm to training data comprising each baseline received, each cost percentage estimation received, and each label assigned to each cluster;
for each label assigned to each cluster, computing a corresponding probability distribution representing a prediction of corresponding actual historic cost data included in the cluster based on the classification model;
receiving a new client solution comprising at least one of the one or more services; and
increasing accuracy of cost estimation for the new client solution by:
for each service of the new client solution:
receiving a selection of historic peer deals comprising a first range of actual historic cost data for the service;
transforming the first range of actual historic cost data into a second range of actual historic cost data that is narrower than the first range of actual historic data by:
predicting a label for the service by classifying the selection of historic peer deals into a cluster using the classification model, wherein the label predicted is a label assigned to the cluster;
ordering a subset of the selection of historic peer deals based on unit costs;

generating a list of unit costs for the label predicted that has more unit costs than the subset ordered by applying a percentile function that maintains a relative size of the cluster;

transforming the relative size of the cluster based on a corresponding probability distribution computed for the label predicted;

determining a percentile range of unit cost estimation for the service that narrows the first range of actual historic cost data into the second range of actual historic cost data by applying another percentile function to the list when the relative size of the cluster is transformed; and generating an output comparing differences between the first range of actual historic cost data and the second range of actual historic cost data in terms of unit cost estimation by percentile; and determining cost estimates of the new client solution based on each percentile range of unit cost estimation for each service included in the new client solution.

2. The method of claim 1, further comprising:
for each service of the new client solution, predicting service complexity of the service based on a percentile range of unit cost estimation for the service.

3. The method of claim 1, wherein each service is an Information Technology (IT) service.

4. The method of claim 1, further comprising:
classifying the set of historic peer deals into the different clusters based on the classification model.

5. The method of claim 1, wherein effectiveness of a service complexity configuration in a top-down complex service design is improved using the second range of actual historic cost data.

6. The method of claim 1, further comprising:
determining performance of the classification model by:
 for each service, producing a corresponding cross table of prediction results for each cluster corresponding to the service using the classification model, wherein each prediction result represents a prediction of actual historic cost data included in a cluster corresponding to the service; and
 determining probabilities of positive test samples included in a cluster based on a probability distribution computed for a label assigned to the cluster.

7. The method of claim 1, wherein transforming the first range of actual historic cost data into the second range of actual historic cost data further comprises:
ordering the selection of historic peer deals based on unit costs; and
generating a list of unit costs for the label predicted by applying a percentile function to the ordered selection of historic peer deals, wherein a number of unit costs included in the list is larger than a number of unit costs included the cluster.

8. The method of claim 1, wherein the supervised machine learning algorithm is a k-nearest neighbors algorithm.

9. A system comprising a computer processor, a computer-readable hardware storage device, and program code embodied with the computer-readable hardware storage device for execution by the computer processor to implement a method comprising:
receiving a set of historic peer deals relating to one or more services, wherein the set of historic peer deals is maintained on at least one hardware storage device, and the set of historic peer deals comprises actual historic cost data for each of the one or more services;

for each of the one or more services, receiving a corresponding baseline and a corresponding cost percentage estimation for the service, wherein the corresponding baseline is indicative of a quantity for the service;

for each of the one or more services, clustering actual historic cost data for the service to form at least one corresponding cluster, wherein each cluster includes similar unit costs and is assigned a corresponding label;

training, on a server device, a classification model to classify the set of historic peer deals into different clusters by applying a supervised machine learning algorithm to training data comprising each baseline received, each cost percentage estimation received, and each label assigned to each cluster;

for each label assigned to each cluster, computing a corresponding probability distribution representing a prediction of corresponding actual historic cost data included in the cluster based on the classification model;

receiving a new client solution comprising at least one of the one or more services; and increasing accuracy of cost estimation for the new client solution by:
 for each service of the new client solution:
  receiving a selection of historic peer deals comprising a first range of actual historic cost data for the service;
  transforming the first range of actual historic cost data into a second range of actual historic cost data that is narrower than the first range of actual historic data by:
   predicting a label for the service by classifying the selection of historic peer deals into a cluster using the classification model, wherein the label predicted is a label assigned to the cluster;
   ordering a subset of the selection of historic peer deals based on unit costs;
   generating a list of unit costs for the label predicted that has more unit costs than the subset ordered by applying a percentile function that maintains a relative size of the cluster;
   transforming the relative size of the cluster based on a corresponding probability distribution computed for the label predicted;
   determining a percentile range of unit cost estimation for the service that narrows the first range of actual historic cost data into the second range of actual historic cost data by applying another percentile function to the list when the relative size of the cluster is transformed; and
   generating an output comparing differences between the first range of actual historic cost data and the second range of actual historic cost data in terms of unit cost estimation by percentile; and
  determining cost estimates of the new client solution based on each percentile range of unit cost estimation for each service included in the new client solution.

10. The system of claim 9, the method further comprising:
for each service of the new client solution, predicting service complexity of the service based on a percentile range of unit cost estimation for the service.

11. The system of claim 9, wherein each service is an Information Technology (IT) service.

12. The system of claim 9, the method further comprising:
classifying the set of historic peer deals into the different clusters based on the classification model.

13. The system of claim 9, wherein effectiveness of a service complexity configuration in a top-down complex service design is improved using the second range of actual historic cost data.

14. The system of claim 9, the method further comprising: determining performance of the classification model by:
for each service, producing a corresponding cross table of prediction results for each cluster corresponding to the service using the classification model, wherein each prediction result represents a prediction of actual historic cost data included in a cluster corresponding to the service; and
determining probabilities of positive test samples included in a cluster based on a probability distribution computed for a label assigned to the cluster.

15. The system of claim 9, wherein transforming the first range of actual historic cost data into the second range of actual historic cost data further comprises:
ordering the selection of historic peer deals based on unit costs; and
generating a list of unit costs for the label predicted by applying a percentile function to the ordered selection of historic peer deals, wherein a number of unit costs included in the list is larger than a number of unit costs included the cluster.

16. The system of claim 15, wherein the supervised machine learning algorithm is a k-nearest neighbors algorithm.

17. A computer program product comprising a computer-readable hardware storage device having program code embodied therewith, the program code being executable by a computer to implement a method comprising:
receiving a set of historic peer deals relating to one or more services, wherein the set of historic peer deals is maintained on at least one hardware storage device, and the set of historic peer deals comprises actual historic cost data for each of the one or more services;
for each of the one or more services, receiving a corresponding baseline and a corresponding cost percentage estimation for the service, wherein the corresponding baseline is indicative of a quantity for the service;
for each of the one or more services, clustering actual historic cost data for the service to form at least one corresponding cluster, wherein each cluster includes similar unit costs and is assigned a corresponding label;
training, on a server device, a classification model to classify the set of historic peer deals into different clusters by applying a supervised machine learning algorithm to training data comprising each baseline received, each cost percentage estimation received, and each label assigned to each cluster;
for each label assigned to each cluster, computing a corresponding probability distribution representing a prediction of corresponding actual historic cost data included in the cluster based on the classification model;
receiving a new client solution comprising at least one of the one or more services; and
increasing accuracy of cost estimation for the new client solution by:
for each service of the new client solution:
receiving a selection of historic peer deals comprising a first range of actual historic cost data for the service;
transforming the first range of actual historic cost data into a second range of actual historic cost data that is narrower than the first range of actual historic data by:
predicting a label for the service by classifying the selection of historic peer deals into a cluster using the classification model, wherein the label predicted is a label assigned to the cluster;
ordering a subset of the selection of historic peer deals based on unit costs;
generating a list of unit costs for the label predicted that has more unit costs than the subset ordered by applying a percentile function that maintains a relative size of the cluster;
transforming the relative size of the cluster based on a corresponding probability distribution computed for the label predicted;
determining a percentile range of unit cost estimation for the service that narrows the first range of actual historic cost data into the second range of actual historic cost data by applying another percentile function to the list when the relative size of the cluster is transformed; and
generating an output comparing differences between the first range of actual historic cost data and the second range of actual historic cost data in terms of unit cost estimation by percentile; and
determining cost estimates of the new client solution based on each percentile range of unit cost estimation for each service included in the new client solution.

18. The computer program product of claim 17, the method further comprising:
for each service of the new client solution, predicting service complexity of the service based on a percentile range of unit cost estimation for the service.

19. The computer program product of claim 17, the method further comprising:
using the second range of actual historic cost data to improve effectiveness of a service complexity configuration in a top-down complex service design.

20. The computer program product of claim 17, wherein transforming the first range of actual historic cost data into the second range of actual historic cost data further comprises:
ordering the selection of historic peer deals based on unit costs; and
generating a list of unit costs for the label predicted by applying a percentile function to the ordered selection of historic peer deals, wherein a number of unit costs included in the list is larger than a number of unit costs included the cluster.

* * * * *